(12) United States Patent
Ho et al.

(10) Patent No.: US 8,131,306 B2
(45) Date of Patent: Mar. 6, 2012

(54) WIRELESS ACCESS NETWORK AND METHOD FOR ALLOCATING DATA SUBCARRIERS WITHIN A DOWNLINK SUBFRAME BASED ON GROUPING OF USER STATIONS

(75) Inventors: Minnie Ho, Los Altos, CA (US);
Qinghua Li, Sunnyvale, CA (US);
Xintian E Lin, Mountain View, CA (US); Vallabhajosyula S. Somayazulu, Portland, OR (US); Shilpa Talwar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 941 days.

(21) Appl. No.: 11/687,393

(22) Filed: Mar. 16, 2007

(65) Prior Publication Data

US 2007/0223440 A1  Sep. 27, 2007

Related U.S. Application Data

(60) Provisional application No. 60/784,418, filed on Mar. 20, 2006.

(51) Int. Cl.
*H04W 72/00* (2009.01)

(52) U.S. Cl. ............ 455/452.2; 455/447; 455/450; 455/464; 370/433; 370/441; 370/442; 370/458

(58) Field of Classification Search .............. 455/455, 455/509, 466, 447, 450–454, 464; 370/431, 370/338, 433, 441, 442, 458
See application file for complete search history.

(56) References Cited

U.S. PATENT DOCUMENTS

| | | | |
|---|---|---|---|
| 6,240,076 B1 * | 5/2001 | Kanerva et al. | 370/330 |
| 2002/0119781 A1 * | 8/2002 | Li et al. | 455/450 |
| 2003/0128658 A1 * | 7/2003 | Walton et al. | 370/208 |
| 2005/0159162 A1 * | 7/2005 | Park | 455/450 |
| 2005/0201476 A1 | 9/2005 | Kim et al. | |
| 2006/0120392 A1 * | 6/2006 | Ye et al. | 370/412 |
| 2006/0262874 A1 * | 11/2006 | Shan | 375/267 |

FOREIGN PATENT DOCUMENTS

| | | |
|---|---|---|
| WO | WO-2005086384 A1 | 9/2005 |
| WO | WO-2007109610 A1 | 9/2007 |

OTHER PUBLICATIONS

"Resource Allocation Mapping Rules and TP", Motorola, *Agenda Item 13.1.3 for 3GPP TSG RAN1#44 Meeting*, Denver, CO, Feb. 13-17, 2007, http://www.3gpp.org/ftp/tsg_ran/WG1_RL1/TSGR1_44/Docs/, 1-4.
"Search Report", Application No. PCT/US2007/PCT064302, 3 pgs.
"Text proposal on downlink channelization", *3GPP RAN WG 1 LTE ad hoc meeting document R1-060126*, (Jan. 2006), 23-25.
"Written Opinion", Application No. PCT/US2007/PCT064302, 2 pgs.
Yaghoobi, Hassan, "Scalable OFDMA Physical Layer in IEEE 802.16 WirelessMAN", *Intel technology journal* vol. 08 issue 03 published, (Aug. 20, 2004),204-206.
"Chinese Application Serial No. 200780009924.6, Office Action mailed Mar. 3, 2011", with English translation, 5 pgs.
"Taiwanese Application Serial No. 96109362, Office Action mailed Jun. 9, 2011", 8 pgs.

* cited by examiner (Continued)

*Primary Examiner* — Nick Corsaro
*Assistant Examiner* — Quan Hua
(74) *Attorney, Agent, or Firm* — Schwegman, Lundberg & Woessner, P.A.; Gregory J. Gorrie

(57) ABSTRACT

Embodiments of a wireless access network and method for allocation time and frequency resources are generally described herein. Other embodiments may be described and claimed. In some embodiments, a base station allocates contiguous groups of data subcarriers of a downlink subframe to closed-loop user stations, and allocates the remaining data subcarriers of the downlink subframe to open-loop user stations to increase frequency diversity.

32 Claims, 3 Drawing Sheets

WIRELESS ACCESS NETWORK AND METHOD FOR ALLOCATING DATA SUBCARRIERS WITHIN A DOWNLINK SUBFRAME BASED ON GROUPING OF USER STATIONS

PRIORITY CLAIM

This patent application claims the benefit of priority under 35 U.S.C. 119(e) to the U.S. Provisional Patent Application Ser. No. 60/784,418, filed Mar. 20, 2006, which is incorporated herein by reference.

TECHNICAL FIELD

Some embodiments of the present invention pertain to wireless access networks. Some embodiments of the present invention pertain to multicarrier communications.

BACKGROUND

Some wireless access networks, such as broadband wireless access (BWA) networks and orthogonal frequency division multiple access (OFDMA) networks, use a plurality of individual frequency subcarriers for communicating. In some wireless access networks, base stations allocate these subcarriers among several user stations. Issues with subcarrier allocation techniques address include maximizing performance for the various user stations and efficient utilization of bandwidth.

Thus there are general needs for wireless access networks and methods for allocating the time and frequency recourses of a communication channel. There are also general needs for wireless access networks and methods for allocating the time and frequency recourses of a communication channel that help maximize performance for user stations while efficiently utilizing the channel bandwidth.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
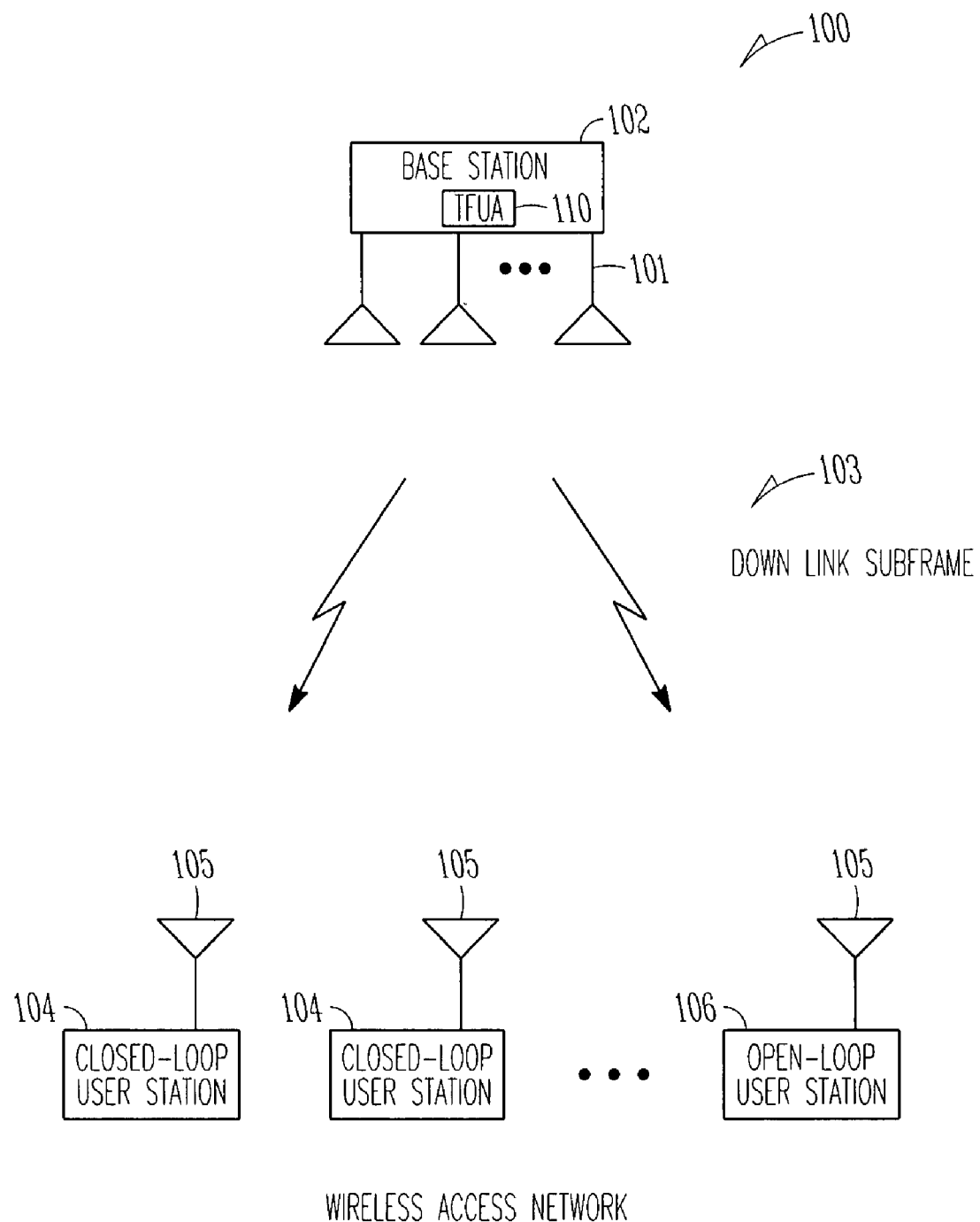
FIG. 1 is a functional block diagram of a wireless access network in accordance with some embodiments of the present invention.

FIG. 1 is a functional block diagram of a wireless access network in accordance with some embodiments of the present invention. In wireless-access network 100, base station 102 may allocate time-frequency units of downlink subframe 103 to closed-loop user stations 104 and to open-loop user stations 106. In some embodiments, base station 102 may allocate contiguous groups of data subcarriers of downlink subframe 103 to closed-loop user stations 104, and may allocate remaining data subcarriers of downlink subframe 103 to open-loop user stations 106 to increase frequency diversity.

In some embodiments, base station 102 may include time-frequency unit allocator (TFUA) 110 which may perform the allocations. Time-frequency unit allocator 110 may comprise software or a combination of hardware, firmware, and software. Various embodiments of the allocation operations of time-frequency unit allocator 110 are discussed in more detail below.

Base station 102 may be coupled to one or more antennas 101 for communicating RF signals with user stations 104 & 106. User stations 104 & 106 may also be coupled to one or more antennas 105 for communicating with one or more base stations, such as base station 102.

Figure 2:
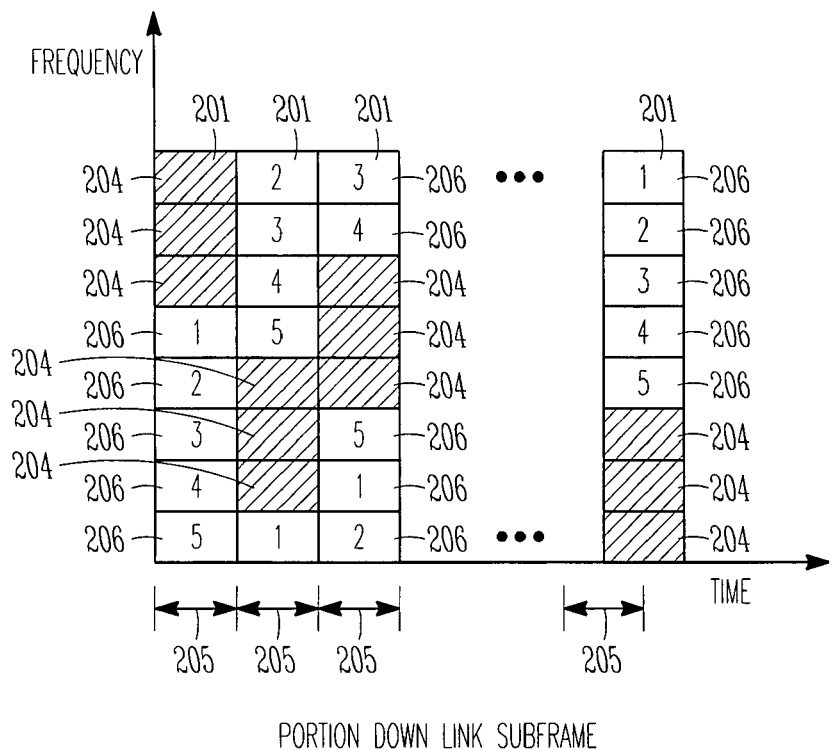
FIG. 2 illustrates time-frequency allocation of a portion of a downlink subframe in accordance with some embodiments of the present invention.

FIG. 2 illustrates time-frequency allocation of a portion of a downlink subframe in accordance with some embodiments of the present invention. Downlink subframe 103 may correspond to downlink subframe 103 (FIG. 1). Downlink subframe 103 comprises time-frequency units 201, which may comprise one or more subcarriers in frequency and one or more time-units 205 in time. Referring to FIGS. 1 and 2 together, in accordance with some embodiments, base station 102 allocates contiguous groups 204 of data subcarriers of downlink subframe 103 to closed-loop user stations 104 (i.e., reduced frequency diversity) and allocates remaining data subcarriers 206 of downlink subframe 103 to open-loop user stations 106 (i.e., increased frequency diversity).

In FIG. 2, the numbers 1-5 shown inside time-frequency units 201 may correspond to a particular open-loop user station 106 that may be assigned that particular time-frequency unit 201. For simplicity, downlink subframe 103 is illustrated in FIG. 2 as having only eight subcarriers (in frequency), however actual implementations may include up to one hundred or more subcarriers.

In some embodiments, base station 102 may allocate contiguous groups 204 of the data subcarriers to closed-loop user stations 104 for each time-unit 205 within downlink subframe 103. Base station 102 may also allocate remaining data subcarriers 206 non-contiguously to each open-loop user station 106 for each time-unit 205 within downlink subframe 103. In these embodiments, time-diversity as well as frequency diversity may be maximized for each open-loop user station 106.

In some embodiments, wireless access network 100 may be an orthogonal frequency division multiple access (OFDMA) network, and each time-unit 205 may comprise an OFDMA symbol. Base station 102 may allocate the same contiguous groups 204 of the data subcarriers to closed-loop user stations 104 for a plurality of OFDMA symbols. Base station 102 may allocate different ones of remaining data subcarriers 206 to open-loop user stations 106 for each OFDMA symbol. In these embodiments, the same contiguous groups 204 of the data subcarriers may be allocated to closed-loop user stations 104 for more than one or all OFDMA symbols of downlink subframe 103. In some 3GPP LTE embodiments, discussed below, there may be six or seven OFDMA symbols of a downlink subframe, although the scope of the invention is not limited in this respect. In some alternate embodiments, the same remaining data subcarriers 206 may be allocated to open-loop user stations 106 for more than one or all OFDMA symbols of downlink subframe 103, although the scope of the invention is not limited in this respect.

One advantage to allocating contiguous groups 204 of the data subcarriers to closed-loop user stations 104 for a plurality of OFDMA symbols is that the channel response variation across frequency may be greater than it is across time. Another advantage to allocating contiguous groups 204 of the data subcarriers to closed-loop user stations 104 for a plurality of OFDMA symbols, rather than a per-symbol basis, is that that overhead may be reduced. In other words, the allocated time-frequency block may be provided over a narrower span in frequency and wider span in time. On the other hand, for open-loop user stations 206, it may be desirable to increase frequency diversity so that subcarriers allocated to open-loop user stations 106 may be widely distributed across frequency (i.e., a larger span in frequency).

In some embodiments, for each time-unit 205, contiguous groups 204 of data subcarriers may be allocated to closed-loop user stations 104 prior to the allocation of remaining data subcarriers 206 to open-loop user stations 106. In these embodiments, in each subsequent time-unit 205, after an initial allocation of contiguous groups 204 of data subcarriers to closed-loop user stations 104, remaining data subcarriers 206 may be reallocated to open-loop user stations 106.

In some embodiments, base station 102 may allocate remaining data subcarriers 206 to open-loop user stations 106 by systematically partitioning a sequence of remaining contiguous data subcarriers into multiple subsequences, and allocating data subcarriers associated with one of the multiple sequences to open-loop user stations 106 on a per-sequence basis. These embodiments are discussed in more detail below. In some embodiments, the multiple subsequences may be selected to have varying lengths. In other embodiments, the multiple subsequences may be selected to have the same length. In these embodiments that use multiple subsequences of the same length or varying length, remaining data subcarriers 206 may be intermixed among open-loop user stations 106, which may help maximize both frequency diversity and time diversity.

Figures 4A, 4B, 4C:
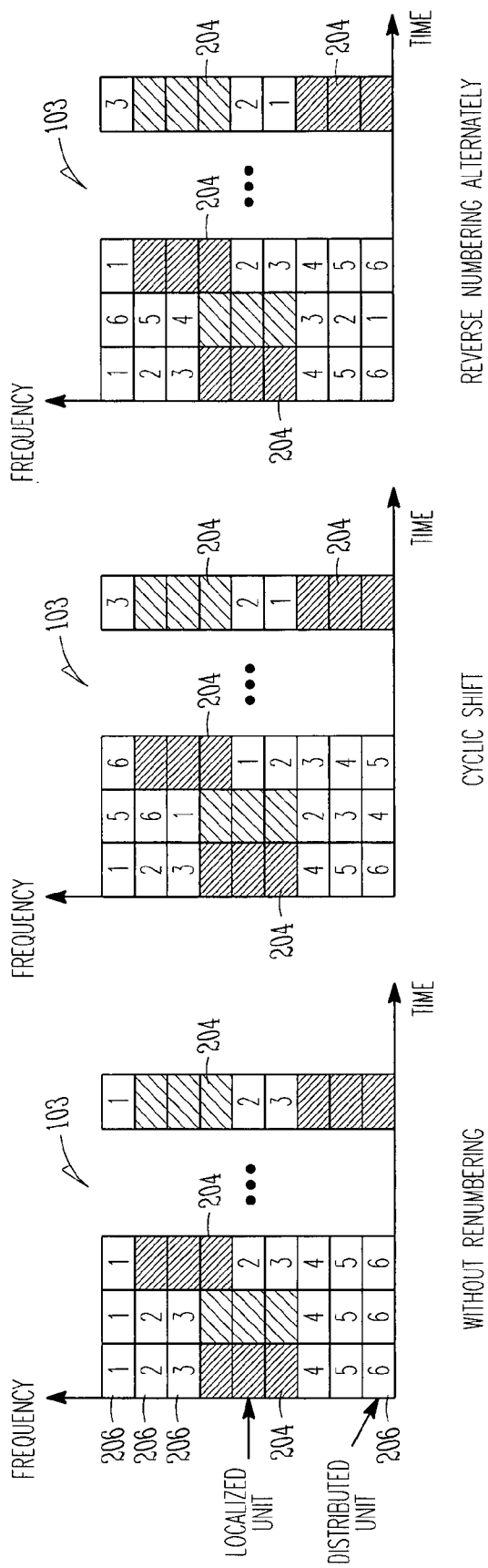
FIG. 4A illustrates a downlink subframe without renumbering of subcarriers.
FIG. 4B illustrates a downlink subframe with cyclically shifted renumber subcarriers accordance with some embodiments of the present invention.
FIG. 4C illustrates a downlink subframe with reverse alternate numbering of subcarriers accordance with some embodiments of the present invention.

In some embodiments, base station 102 may reallocate remaining data subcarriers 206 of downlink subframe 103 to open-loop user stations 106 by cyclically shifting remaining data subcarriers 206 for each one or more time-units 205. Remaining data subcarriers 206 may be reallocated to open-loop user stations 106 based on the cyclically shifting. An example of this is illustrated in FIG. 4B, described in more detail below.

In some other embodiments, base station 102 may reallocate remaining data subcarriers 206 of downlink subframe 103 to open-loop user stations 106 by renumbering remaining data subcarriers 206 for each one or more time-units 205. Remaining data subcarriers 206 may be reallocated to open-loop user stations 106 based on the renumbering. An example of this is illustrated in FIG. 4C, described in more detail below.

Closed-loop user stations 104 may comprise user stations with a known channel state, and open-loop user stations 106 comprise user stations with an unknown channel state. In some embodiments, base station 102 may select contiguous groups 204 of data subcarriers for allocation based on favorable channel state information provided by closed-loop user stations 104, although the scope of the invention is not limited in this respect. In these embodiments, closed-loop user stations 104 may feed back either partial or full channel state information to base station 102. In these embodiments, base station 102 may select a contiguous group of subcarriers for allocation a closed-loop user station 104 based on the fed-back channel state information.

In some embodiments, base station 102 may allocate contiguous groups 204 of data subcarriers based on an index provided by closed-loop user stations 104. The index may indicate a group of contiguous data subcarriers selected by a particular closed-loop user station 104. In these other embodiments, closed-loop user stations 104 may feed back an index to base station 102 indicating a desired sub-band (i.e., a contiguous group of subcarriers). In these embodiments, base station 102 may allocate a contiguous group 204 of subcarriers to a particular closed-loop user station 104 that is indicated by the index.

In some embodiments, base station 102 may determine the number of the data subcarriers of a contiguous group to allocate to each closed-loop user station 104 based on a coherence bandwidth of a channel associated with each of closed-loop user stations 104, although the scope of the invention is not limited in this respect. In some embodiments, the number of data subcarriers of a group allocated to the closed-loop stations may vary (i.e., the chunk size may vary) as there is no requirement that each contiguous group 204 comprise the same number of subcarriers.

In some embodiments, downlink subframe 103 may comprise a set of pilot subcarriers. Both closed-loop user stations 104 and open-loop user stations 106 may use the same set of pilot subcarriers for channel estimation for use in processing received data. In these embodiments, the pilot subcarriers may be common to both closed-loop and open-loop user stations 104, 106. As discussed above, closed-loop user stations 104 may provide channel state information based on channel estimates to base station 102. In some embodiments, an open-loop user station 106 may become a closed-loop user station 104 after it provides channel state information to base station 102. On the other hand, a closed-loop user station 104 may become an open-loop user station 106 when base station 102 no longer possesses valid channel state information for that user station.

In some embodiments, base station 102 may use beamforming to send data to some closed-loop user stations 104. In these embodiments, some dedicated pilot subcarriers may be sent over a beam formed channel to allow a closed-loop user station 104 to estimate a beamforming matrix or weights and the channel response matrix. These dedicated pilots are generally not received or utilized by other user stations. In accordance with some embodiments, closed-loop user stations 104 that do not employ beamforming may achieve increased performance by selecting a favorable sub-band, as discussed above. In embodiments that employ beamforming, the common pilot subcarriers are not beam formed so that all user stations may be able to estimate the channel response without being affected by beamforming weights.

Although base station 102 is illustrated as having several separate functional elements, one or more of the functional elements may be combined and may be implemented by combinations of software-configured elements, such as processing elements including digital signal processors (DSPs), and/or other hardware elements. For example, some elements, such as TFUA 110, may comprise one or more microprocessors, DSPs, application specific integrated circuits (ASICs), and combinations of various hardware and logic circuitry for performing at least the functions described herein. In some embodiments, the functional elements of base station 102, such as TFUA 110, may refer to one or more processes operating on one or more processing elements.

For closed-loop user stations 104, it may not be very likely that each closed-loop user station 104 scheduled is downlink subframe 103 rides on its peak channel response because the peaks of different closed-loop user stations 104 may collide, (i.e. two closed-loop user stations 104 desire for the same subcarrier or group of subcarriers). Similarly, it is likely that some subcarriers may be unfavorable to many closed-loop user stations 104 and should not be assigned to closed-loop user stations 104. This may create waste for the system resource. Because open-loop user stations 106 are not particular as to the subcarriers that are assigned as long as the assigned subcarriers have enough frequency (or time) span (i.e. frequency diversity), the combining of the two modes of subcarrier allocation as discussed above may help reduce waste resulting in more efficient use of the channel bandwidth. In these embodiments, base station 102 may first allocate contiguous groups 204 of subcarriers (using a localized technique) to closed-loop user stations 104 whose channel state information is available, and may then allocate remaining subcarriers 206 to open-loop user stations 106. Some specific embodiments for allocating remaining subcarriers 206 to open-loop user stations 106 are described in more detail below.

In some embodiments, remaining subcarriers 206 may first be renumbered to form a group. Base station 102 may assign subcarriers in the group to different open-loop user stations 106. The number of subcarriers allocated to each of open-loop user stations 106 may be different. One goal for subcarrier assignment to open-loop user stations 106 is to help increase or maximize frequency diversity. In some embodiments, base station 102 may implement two criterions: span range and evenness. In these embodiments, the assigned subcarriers may span out in the remaining bandwidth as widely as possible and the sum of the deviations of the subcarrier spacing may be minimized for each of open-loop user stations 106. The smaller the deviation, the evener the subcarrier spacing for a particular open-loop user station 106 may be.

Some embodiments for allocating remaining subcarriers 206 among open-loop user stations 106 partition a sequence of natural numbers into subsequences such that the sum of the deviations of the subsequence's spacing is minimized. The allocation may remain constant for one or multiple OFDMA symbols, although the scope of the invention is not limited in this respect. In these embodiments:

$N_s$=the number of available subcarriers;
K=the number of scheduled open-loop user stations 106;
$L_k$=the number of subcarriers needed by the k-th user station.

Figure 3:
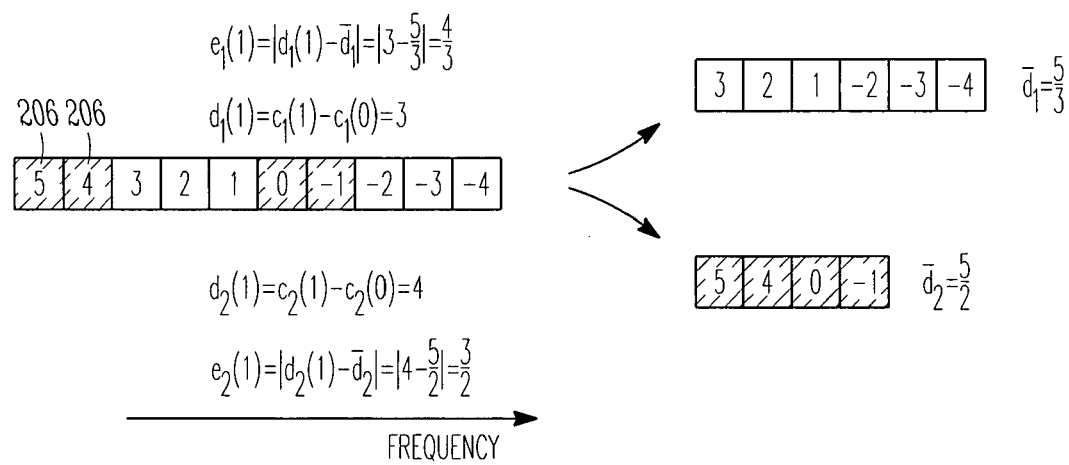
FIG. 3 illustrates subcarrier spacing and spacing deviation in accordance with some embodiments of the present invention.

The optimality of the allocation technique may be measured by the sum of the deviations on each user station's subcarrier spacing as follows:

$$m = \sum_{k=1}^{K} e_k$$

where $d_k(i)=c_k(i)-c_k(i-1)$ is the i-th subcarrier spacing of the k-th user station, i=2, ..., $L_k$; $c_k(i)$ is the subcarrier location;

$$e_k = \sum_{i=1}^{L_k} |d_k(i) - \bar{d}_k|^\gamma$$

is the deviation from the mean spacing for the k-th user station and γ is some integer e.g. 1 or 2. An example of this allocation technique is illustrated in FIG. 3.

In some embodiments, frequency partitioning is performed. In these embodiments, $N_s$ subcarriers may be assigned to open-loop user stations 106 according to their loads, $L_k$ s. The loads, $L_k$ s, may be sorted in decreasing order so that $L_{k-1} \geq L_k$ for k=2, ..., K.

In some embodiments, an optimal allocation may be performed. In these embodiments, the common factor of ratio $L_1:L_2:...:L_K$ may be first removed and the resultant ratio is $l_1:l_2:...:l_K$. The optimal allocation for the ratio can be found using the Viterbi search algorithm, although the scope of the invention is not limited in this respect. Because the search may be time consuming, the allocation pattern for each usable ratio may be computed and stored off line, although the scope of the invention is not limited in this respect.

In some embodiments, a suboptimal allocation may be performed. In these embodiments, the common factor of ratio $L_1:L_2:...:L_K$ may be first removed and the resultant ratio may be $l_1:l_2:...:l_K$. The suboptimal allocation for the ratio can be computed using the 'round' algorithm. Because the computation may be simple, the allocation pattern may be generated on line on by both base station 102 and user stations 104, 106.

In some embodiments, the following process may be used to determine the suboptimal allocation. A 'round' technique may be used to first sorts the loads of the user stations as $l_1 \geq ... \geq l_K$, and then assign remaining subcarriers 206 to each open-loop user stations 106 as follows.

1) Set n=1.
2) Compute the index on the remaining subcarriers $$q_i = \text{round}\left(\frac{i}{l_n} \sum_{k=n}^{K} l_k\right)$$

and assign the $q_i$-th subcarrier to user station n for i=1 ... $L_n$.

3) Renumber the remaining subcarriers.
4) If n<K, increment n and return to step 2. Otherwise, assign the remaining subcarriers to user station K.

The term 'round' refers to the function "round" that rounds a real number to the closest integer, and the function can be replaced by integer functions such as floor and ceiling. Since a first open-loop user station 106 may receive an optimal spacing for its subcarriers, the technique may allocate remaining subcarriers to an open-loop user station 106 with the greatest load first. As a result, an earlier allocated open-loop user station 106 may be assigned subcarriers with better spacing than a later allocated open-loop user station 106 because there are more available options for the earlier.

In another embodiment, some subcarriers are not assigned to any of open-loop user stations 106 because there may be subcarriers remaining after the allocation. In these embodiments, a virtual (or dummy) user station may be utilized for the unassigned subcarriers. The virtual user station may be treated the same as open-loop user stations 106 and may use the allocation techniques discussed above. The load of the virtual user station may be sorted with actual user stations. After all the subcarriers are allocated, no data is transmitted on the subcarriers allocated to the virtual user station. In other embodiments, the 'round' algorithm 'round' algorithm may be modified to accommodate a virtual user station.

In other embodiments, the loads of real open-loop user stations 106 $L_k$ s, may be sorted in decreasing order so that $L_{k-1} \geq L_k$ for $k=2, \ldots, K$. The load of a virtual user station may be denoted as $L_{K+1}$ is $$N_s - \sum_{k=1}^{K} L_k.$$

It should be noted that $L_{K+1}$ may be greater than some $L_k$ for $k=1, \ldots, K$. The common factor of ratio $L_1:L_2: \ldots :L_K:L_{K+1}$ may be first removed and the resultant ratio is $l_1:l_2: \ldots :l_K:l_{K+1}$.

The following process may be used:
1) Set n=1.
2) Compute the index on the remaining subcarriers $$q_i = \text{round}\left(\frac{i}{l_n} \sum_{k=n}^{K+1} l_k\right)$$

and assign the $q_i$-th subcarrier to user station n for $i=1 \ldots L_n$. The technique name comes from the function "round" that rounds a real number to the closest integer, and the function can be replaced by integer functions such as floor and ceiling.

3) Renumber the remaining subcarriers.
4) If $n \leq K$, increment n and return to step 2. Otherwise, stop and the remaining subcarriers are unused.

The process described above may be used to add a virtual user station at the last place when allocating remaining groups 206 of subcarriers. Similarly, the virtual user station can be added in the first place and the unused subcarriers may be extracted first using the suboptimal algorithm in case one, although the scope of the invention is not limited in this respect.

In other embodiments, the allocated subcarriers may be spread out across the entire bandwidth for real open-loop user stations 106. In networks that include more than one base station and when base stations do not effectively coordinate their resource allocation with each other, base station 102 may spread out the allocated subcarriers for open-loop user stations 106 to avoid co-channel interference. For example, if two base stations share the subcarriers and each cell may have three user stations, each user station may be assigned one subcarrier. Using technique 1, cell one may use subcarriers 8, 9, 10 and cell two also use subcarriers 8, 9, 10. If there is no difference in numbering subcarriers in both cells, the two cells may interfere each other. If there is a difference in the numbering or there is coordination between the cells, the two sets of contiguous subcarriers can separate apart. When there is little or no coordination between cells of base stations, it may be more desirable to spread out the allocated contiguous subcarriers to avoid overlap. When there is coordination between base stations, the contiguous effect of the allocation techniques described above may be desirable for interference avoidance.

In some embodiments, the following subcarrier allocation technique may be used to help equalize the resource allocated to the user stations.

First, the set of physical resources is defined as $S_i = i$, $i=1, 2, \ldots, N_s$, where $$L = \sum_{k=1}^{K} L_k$$

is the total number of allocated subcarriers for the real user stations; $N_s \geq L$, and define the spacing factor as $S=[N_s/L]$. The steps in this process may be as follows:

1) Sort the user stations according to their subcarrier resource requirements such that $l_1 \geq l_2 \geq \ldots \geq l_K$.
2) Set n=1 and $\tilde{N}_s = N_s$
3) For $i=1 \ldots, l_n$, define $$j = \begin{cases} iS, & i = 1, \ldots, \lceil \tilde{N}_s/S \rceil \\ \text{mod}(iS-1, N_s) + 1, & i > \lceil \tilde{N}_s/S \rceil \end{cases}$$

4) Compute the set of indices $$q_i = \text{ceil}\left(\frac{j}{l_n} \sum_{k=n}^{K} l_k\right), i = 1, \ldots, l_n,$$

where ceil can be replaced by round or floor, and further modify it to obtain $q_i = \text{mod}(q_i - 1, \tilde{N}_s) + 1$. Next, assign the set of resource elements (subcarriers) $\{q_i, \text{ for } i=1, \ldots, l_n\}$ $\{S_i\}$ to the $n^{th}$ user with requirement $l_n$.

5) Remove the subcarriers assigned in the previous step from $\{S_i\}$ to form the updated set of subcarriers remaining to be assigned. Update $\tilde{N}_s$ to reflect the reduced number of available subcarriers.

6) If $n \leq K$, increment n and return to Step 3.

With this procedure, the frequency spreading of the allocated resources may be maximized, although the scope of the invention is not limited in this respect.

In some embodiments, subcarrier allocations may be permuted across time-units 205. When a user station is allocated subcarriers on two adjacent time-units 205, it may be desirable that the location of the user station's subcarrier varies across time to further maximize frequency diversity. This may allow the user station employ different sets of subcarriers across time. In some embodiments, time permutation may be performed by renumbering subcarriers over time as illustrated in FIGS. 4B and 4C, discussed in more detail below. The renumbering may be performed to maintain the continuity of the subcarriers. Two methods include shift and reversion. As discussed above, a time-unit 205 for allocation of subcarriers to open-loop user stations 106 may be one OFDMA symbol while closed-loop user stations 104 may be allocated subcarriers for more than one time-unit 205 which may comprise up to one sub-frame with six or more OFDMA symbols, although the scope of the invention is not limited in this respect.

In some embodiments, base station 102 may cyclically shift the number of the subcarriers before or after the localized units are allocated. Namely, the starting point of the subcarrier numbering varies across OFDMA symbols and the numbering wraps around within the bandwidth.

FIG. 4A illustrates a downlink subframe without renumbering of subcarriers. FIG. 4B illustrates a downlink subframe with cyclically shifted renumber subcarriers accordance with some embodiments of the present invention. FIG. 4C illustrates a downlink subframe with reverse alternate numbering of subcarriers accordance with some embodiments of the present invention. In FIGS. 4A-4C, the numbers 1-6 shown inside the time-frequency units may correspond to a particular open-loop user station 106 that may be assigned that particular time-frequency unit 201. For simplicity, downlink subframe 103 is illustrates as having only nine subcarriers (three being assigned as a group of contiguous subcarriers), however actual implementations may include up to one hundred or more subcarriers.

Referring to FIG. 4B, when subcarriers are shifted before closed-loop user stations 104 are allocated, the renumbering of the remaining subcarriers may start from the remaining subcarrier has the lowest number in the original numbering. The subcarrier number of the shift may be greater than coherence bandwidth of the channel. For example, shifting 75 subcarriers, which corresponds to a bandwidth 1.125 MHz, may be sufficient for 3GPP LTE networks, although the scope of the invention is not limited in this respect.

Referring to FIG. 4C, in these embodiments, reverse numbering may be employed. In these embodiments, the numbering of subcarriers may be reversed alternately for every time-unit 205 either before or after closed-loop user stations 104 are allocated (i.e., either before or after contiguous groups 204 of subcarriers are assigned to closed-loop user stations 104). The renumbering of the remaining subcarriers may start from the remaining subcarrier has the smallest number in original numbering, although the scope of the invention is not limited in this respect.

In some embodiments, the allocation of subcarriers may be to be specified by base station 102 in the downlink (control) channel or mapping frame so that the addressed user stations can retrieve their data. In some embodiments, base station 102 may first specify the subcarrier allocations for closed-loop user stations 104 per time allocation unit. The subcarrier allocations for open-loop user stations 106 may be specified as follows: The load ratio $l_1:l_2:\ldots:l_K$ and corresponding user station indexes (or IDs) may be sent, where the index and load of the virtual user station may be included. The renumbering method may be predetermined and may not need to be specified, although the scope of the invention is not limited in this respect.

In some embodiments, the techniques for frequency-time resource allocation discussed here may be suitable for use in 3GPP LTE systems, although the scope of the invention is not limited in this respect. These embodiments of the present invention may help maximize multi-user station diversity for closed-loop user stations 104 and frequency-time diversity for open-loop user stations 106, simultaneously, although the scope of the invention is not limited in this respect.

In some embodiments, user stations 104, 106 may comprise a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, base station 102 and user stations 104, 106 may communicate in accordance with standards such as the Pan-European mobile system standard referred to as the Global System for Mobile Communications (GSM), including communication techniques in accordance with 3G wireless standards (e.g., the third generation partnership program (3GPP) Technical Specification, Version 3.2.0, March 2000, or later). In some embodiments, base station 102 and user stations 104, 106 may communicate in accordance with the 3GPP long-term evolution (LTE) specifications, although the scope of the invention is not limited in this respect.

In some other embodiments, base station 102 may be part of a Worldwide Interoperability for Microwave Access (WiMax) communication station. In some embodiments, base station 102 and user stations 104, 106 may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions.

Antenna 101, 105 may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input, multiple-output (MIMO) embodiments, antennas 101, 105 may be effectively separated to take advantage of spatial diversity and the different channel characteristics that may result between base station 102 and user stations 104, 106.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware and software. Embodiments may also be implemented as instructions stored on a computer-readable storage medium, which may be read and executed by at least one processor to perform the operations described herein. A computer-readable storage medium may include any mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus, the following claims are hereby incorporated into the detailed description, with each claim standing on its own as a separate preferred embodiment.

What is claimed is:

1. In a wireless-access network, a method for allocating time-frequency units of a downlink subframe to user stations, the method comprising:
   receiving feedbacks indicative of channel state transmitted from at least some of the user stations,
   classifying each of the user stations based on the feedbacks, wherein classifying comprises classifying user stations with a known channel state that have provided the feedback as closed-loop user stations and classifying open-loop user stations are user stations with an unknown channel state due to a lack of said feedback as open-loop user stations;
   based on a predetermined radio frequency (RF) spacing threshold, identifying contiguous groups of subcarriers from group of subcarriers within a system bandwidth available for allocation by comparing each group's RF spacing against said threshold, and determining groups of subcarriers that have RF spacing no more than the predetermined threshold;
   allocating at least some of the contiguous groups of data subcarriers of the downlink subframe from the available contiguous groups to the closed-loop user stations by allocating adjacent groups of data subcarriers to the closed-loop user stations for at least a predetermined number of OFDMA symbols of the downlink subframe; and
   after the allocation of the contiguous groups of data subcarriers to the closed-loop user stations, allocating remaining groups of data subcarriers of the downlink subframe to the open-loop user stations for each OFDMA symbol including by reallocating different groups of the remaining data subcarriers to the open-loop user stations for at least the predetermined number OFDMA symbols of the downlink subframe,
   wherein the remaining groups of subcarriers that are allocated to the open-loop user stations comprise groups of subcarriers that have frequency spans exceeding the predetermined spacing threshold by at least a group of subcarriers.

2. The method of claim 1 wherein the downlink subframe comprises a plurality of time-units, and
   wherein the method further comprises:
   allocating the contiguous groups of the data subcarriers to the closed-loop user stations for each time-unit within the downlink subframe; and
   allocating the remaining data subcarriers non-contiguously to the open-loop user stations for each time-unit within the downlink subframe.

3. The method of claim 2 wherein the wireless-access network is an orthogonal frequency division multiple access (OFDMA) network,
   wherein each time-unit comprises an OFDMA symbol.

4. The method of claim 3 wherein the method is performed by a WiMAX configured base station that operates in accordance with one of the IEEE 802.16 standards.

5. The method of claim 3 wherein the method is performed by a Long Term Evolution (LTE) configured base station that operates in accordance with one of the 3GPP standards.

6. The method of claim 2 wherein for each time-unit, the contiguous groups of data subcarriers are allocated to the closed-loop user stations prior to the allocation of the remaining data subcarriers to the open-loop user stations.

7. The method of claim 2 further comprising reallocating remaining data subcarriers of the downlink subframe to open-loop user stations by:
   cyclically shifting the remaining data subcarriers for each one or more time units; and
   allocating the remaining data subcarriers to the open-loop user stations based on the cyclically shifting to increase time and frequency diversity for the open-loop user stations.

8. The method of claim 2 further comprising reallocating remaining data subcarriers of the downlink subframe to open-loop user stations by:
   renumbering the remaining data subcarriers for each one or more time units; and
   allocating the remaining data subcarriers to the open-loop user stations based on the renumbering to increase time and frequency diversity for the open-loop user stations.

9. The method of claim 1 wherein the contiguous groups of data subcarriers are selected for allocation by a base station based on channel state information provided by the closed-loop user stations.

10. The method of claim 1 wherein the contiguous groups of data subcarriers allocated by a base station based on an index provided by the closed-loop user stations, the index indicating a group of contiguous data subcarriers selected by the closed-loop user stations.

11. The method of claim 1 further comprising determining a number of the data subcarriers of a contiguous group to allocate to each closed-loop user stations based on a coherence bandwidth of a channel associated with each of the closed-loop user stations.

12. The method of claim 1 wherein the downlink subframe comprises a set of pilot subcarriers, and
   wherein both the closed-loop user stations and the open-loop user stations use the set of pilot subcarriers for channel estimation for use by the closed-loop and open-loop user stations in processing received data.

13. In a wireless-access network, a method for allocating time-frequency units of a downlink subframe to user stations, the method comprising:
   receiving feedbacks indicative of channel state transmitted from at least some of the user stations, classifying each of the user stations based on the feedbacks, wherein classifying user stations with a known channel state that have provided the feedback as closed-loop user stations, and classifying user stations with an unknown channel state due to a lack of said feedback as open-loop user stations;
   based on a predetermined radio frequency (RF) spacing threshold, identifying contiguous groups of subcarriers from group of subcarriers within a system bandwidth available for allocation by comparing each group's RF spacing against said threshold, and determines groups of subcarriers that have RF spacing no more than the predetermined threshold;
   allocating at least some of the identified contiguous groups of data subcarriers of the downlink subframe to the closed-loop user stations by allocating adjacent groups of data subcarriers to the closed-loop user stations for at least a predetermined number of OFDMA symbols of the downlink subframe;
and
after the allocation of the contiguous groups of data subcarriers to the closed-loop user stations, allocating remaining groups of data subcarriers of the downlink subframe to the open-loop user stations for each OFDMA symbol,
wherein the remaining data subcarriers are allocated to the open-loop user stations by:
partitioning, using a set of predetermined rules, a sequence of remaining contiguous data subcarriers that have frequency spans exceeding the predetermined spacing threshold by at least a group of subcarriers into multiple subsequences; and
allocating some of the remaining data subcarriers associated with one of the multiple sequences to the open-loop user stations on a per-sequence basis to increase time and frequency diversity.

14. The method of claim 13 wherein the multiple subsequences are selected to have varying lengths.

15. The method of claim 13 wherein the multiple subsequences are selected to have the same length.

16. An apparatus comprising:
a processor configured to:
receive feedbacks indicative of channel state transmitted from at least some of the user stations,
classify each of the user stations based on the feedbacks, wherein classifying comprises classifying user stations with a known channel state that have provided the feedback as closed-loop user stations and
classify open-loop user stations are user stations with an unknown channel state due to a lack of said feedback as open-loop user stations;
a time-frequency unit allocator configured to:
based on a predetermined radio frequency (RF) spacing threshold, identify contiguous groups of subcarriers from group of subcarriers within a system bandwidth available for allocation by comparing each group's RF spacing against said threshold, and determine groups of subcarriers that have RF spacing no more than the predetermined threshold;
allocating at least some of the contiguous groups of data subcarriers of the downlink subframe from the available contiguous groups to the closed-loop user stations by allocating adjacent groups of data subcarriers to the closed-loop user stations for at least a predetermined number of OFDMA symbols of the downlink subframe; and
after the allocation of the contiguous groups of data subcarriers to the closed-loop user stations, to allocate remaining groups of data subcarriers of the downlink subframe to the open-loop user stations for each OFDMA symbol including by reallocating different groups of the remaining data subcarriers to the open-loop user stations for at least the predetermined number OFDMA symbols of the downlink subframe.

17. The apparatus of claim 16 wherein the downlink subframe comprises a plurality of time-units, and
wherein the time-frequency unit allocator allocates the contiguous groups of the data subcarriers to the closed-loop user stations for each time-unit within the downlink subframe, and allocates the remaining data subcarriers non-contiguously to the open-loop user stations for each time-unit within the downlink subframe.

18. The apparatus of claim 17 wherein the apparatus operates in an orthogonal frequency division multiple access (OFDMA) network,
wherein each time-unit comprises an OFDMA symbol.

19. The apparatus of claim 18 wherein the apparatus is a WiMAX configured base station that operates in accordance with one of the IEEE 802.16 standards.

20. The apparatus of claim 18 wherein the apparatus is a Long Term Evolution (LTE) configured base station that operates in accordance with one of the 3GPP standards.

21. The apparatus of claim 17 wherein for each time-unit, the time-frequency unit allocator allocates the contiguous groups of data subcarriers to the closed-loop user stations prior to the allocation of the remaining data subcarriers to the open-loop user stations.

22. The apparatus of claim 17 wherein to reallocates remaining data subcarriers of the downlink subframe to open-loop user stations, the time-frequency unit allocator cyclically shifts the remaining data subcarriers for each one or more time units, and allocates the remaining data subcarriers to the open-loop user stations based on the cyclically shifting to increase time diversity and frequency diversity for the open-loop user stations.

23. The apparatus of claim 17 wherein to reallocate remaining data subcarriers of the downlink subframe to open-loop user stations, the time-frequency unit allocator renumbers the remaining data subcarriers for each one or more time units, and allocates the remaining data subcarriers to the open-loop user stations based on the renumbering to increase time diversity and frequency diversity for the open-loop user stations.

24. The apparatus of claim 16 wherein the contiguous groups of data subcarriers are selected for allocation by the time-frequency unit allocator based on channel state information provided by the closed-loop user stations.

25. The apparatus of claim 16 wherein closed-loop user stations comprise user stations with a known channel state,
wherein open-loop user stations comprise user stations with an unknown channel state, and
wherein the contiguous groups of data subcarriers are allocated by the time-frequency unit allocator based on an index provided by the closed-loop user stations, the index indicating a group of contiguous data subcarriers selected by the closed-loop user stations.

26. The apparatus of claim 16 wherein the time-frequency unit allocator determines a number of the data subcarriers of a contiguous group to allocate to each closed-loop user stations based on a coherence bandwidth of a channel associated with each of the closed-loop user stations.

27. The apparatus of claim 16 wherein the downlink subframe comprises a set of pilot subcarriers, and
wherein both the closed-loop user stations and the open-loop user stations use the set of pilot subcarriers for channel estimation for use by the closed-loop and open-loop user stations in processing received data.

28. An apparatus comprising:
a processor configured to:
receive feedbacks indicative of channel state transmitted from at least some of the user stations,
classify each of the user stations based on the feedbacks, wherein classifying comprises classifying user stations with a known channel state that have provided the feedback as closed-loop user stations and
classify open-loop user stations are user stations with an unknown channel state due to a lack of said feedback as open-loop user stations;

a time-frequency unit allocator configured to:

based on a predetermined radio frequency (RF) spacing threshold, identify contiguous groups of subcarriers from group of subcarriers within a system bandwidth available for allocation by comparing each group's RF spacing against said threshold, and determine groups of subcarriers that have RF spacing no more than the predetermined threshold;

allocating at least some of the contiguous groups of data subcarriers of the downlink subframe from the available contiguous groups to the closed-loop user stations by allocating adjacent groups of data subcarriers to the closed-loop user stations for at least a predetermined number of OFDMA symbols of the downlink subframe;

and after the allocation of the contiguous groups of data subcarriers to the closed-loop user stations, to allocate remaining groups of data subcarriers that have frequency spans exceeding the predetermined spacing threshold by at least a group of subcarriers of the downlink subframe to the open-loop user stations for each OFDMA symbol, wherein to allocate the remaining data subcarriers to the open-loop user stations, the time-frequency unit allocator systematically partitions a sequence of remaining contiguous data subcarriers into multiple subsequences, and allocates some of the remaining data subcarriers associated with one of the multiple sequences to the open-loop user stations on a per-sequence basis.

29. A method of allocating time-frequency units of an OFDMA downlink subframe comprising:

receive feedbacks indicative of channel state transmitted from at least some of the user stations, classify each of the user stations based on the feedbacks, wherein classifying comprises classifying user stations with a known channel state that have provided the feedback as closed-loop user stations and classify open-loop user stations are user stations with an unknown channel state due to a lack of said feedback as open-loop user stations;

in response to said classifying, determining available blocks of time-frequency units with a narrower span in frequency and a wider span in time and allocating said blocks of time-frequency units to the user stations with a known channel state; and determining remaining blocks of time-frequency units with a wider span in frequency and allocating said remaining blocks of time-frequency units a narrower span in time to the user stations with an unknown channel state, wherein said determining comprises, based on a predetermined radio time-frequency (RF) span threshold, identifying blocks of time-frequency units with a narrower span in frequency and a wider span in time by comparing the spans against said threshold.

30. The method of claim 29 wherein the allocation of blocks of time-frequency units to the user stations with the known channel state is performed prior to the allocation of blocks of time-frequency units to the user stations with the unknown channel state.

31. The method of claim 30 wherein the method is performed by a WiMAX configured base station that operates in accordance with one of the IEEE 802.16 standards.

32. The method of claim 30 wherein the method is performed by a Long Term Evolution (LTE) configured base station that operates in accordance with one of the 3GPP standards.

* * * * *